US010451286B2

(12) United States Patent
Bassetti et al.

(10) Patent No.: US 10,451,286 B2
(45) Date of Patent: Oct. 22, 2019

(54) GAS-SUPPLY CONNECTION ASSEMBLY, A METHOD OF CONNECTING A GAS SUPPLY LINE TO A GAS INLET PORT, AND A GAS COOKING APPLIANCE

(71) Applicant: Electrolux Appliances Aktiebolag, Stockholm (SE)

(72) Inventors: Alex Bassetti, Forli (IT); Euro Giunchi, Forli (IT)

(73) Assignee: Electrolux Appliances Aktibolag, Stockholm (SE)

( * ) Notice: Subject to any disclaimer, the term of this patent is extended or adjusted under 35 U.S.C. 154(b) by 286 days.

(21) Appl. No.: 15/126,320

(22) PCT Filed: May 5, 2015

(86) PCT No.: PCT/EP2015/059784
§ 371 (c)(1),
(2) Date: Sep. 15, 2016

(87) PCT Pub. No.: WO2015/173058
PCT Pub. Date: Nov. 19, 2015

(65) Prior Publication Data
US 2017/0082293 A1 Mar. 23, 2017

(30) Foreign Application Priority Data
May 16, 2014 (EP) .................................... 14168651

(51) Int. Cl.
*F24C 3/08* (2006.01)
*F16L 13/14* (2006.01)
(Continued)

(52) U.S. Cl.
CPC .............. *F24C 3/082* (2013.01); *B21D 39/06* (2013.01); *F16L 13/14* (2013.01); *F16L 13/147* (2013.01); *F24C 3/008* (2013.01)

(58) Field of Classification Search
CPC ........ F24C 3/082; B21D 39/06; F16L 13/147; F16L 13/166
(Continued)

(56) References Cited

U.S. PATENT DOCUMENTS 2,089,790 A * 8/1937 Halpern ................. B21D 39/04
29/407.05
2,949,319 A * 8/1960 Hutchins ............... F16L 13/007
285/382.5
(Continued)

FOREIGN PATENT DOCUMENTS

DE 4211959 A1 * 10/1993 ............. B21D 39/04
EP 0272511 A2 6/1988
(Continued)

OTHER PUBLICATIONS

Examination report issued in counterpart European application No. 14166651.9 dated Apr. 12, 2017 (5 pages).
(Continued)

*Primary Examiner* — David Bochna
(74) *Attorney, Agent, or Firm* — Pearne & Gordon LLP

(57) ABSTRACT

A gas-supply connection assembly, a method of connecting a gas supply line to a gas inlet port, and a gas cooking appliance. In particular, a gas-supply connection assembly for gas-tightly connecting a gas supply line to a gas inlet port of a gas consumer is provided, in which the gas supply line is inserted into the gas inlet port and connected thereto in that a bulge section effectuated at an outer circumference of the supply line in the inserted condition by plastic deformation thereof gas-tightly engages in a form-fit locking manner into a given indentation in an inner bushing of the gas inlet port.

14 Claims, 4 Drawing Sheets

(51) Int. Cl.
*F24C 3/00* (2006.01)
*B21D 39/06* (2006.01)

(58) Field of Classification Search
USPC .......................................... 285/382.4, 382.5
See application file for complete search history.

(56) References Cited

U.S. PATENT DOCUMENTS

| | | | | | |
|---|---|---|---|---|---|
| 3,112,564 | A | * | 12/1963 | Murray | B21D 39/04 285/382.5 |
| 3,817,562 | A | * | 6/1974 | Cook | F16L 33/32 285/382.5 |
| 3,924,883 | A | * | 12/1975 | Frank | F16L 33/2075 285/382.5 |
| 4,142,843 | A | * | 3/1979 | Kish | F16L 13/16 285/382.4 |
| 4,147,385 | A | * | 4/1979 | van der Velden | F16L 19/0206 285/382.4 |
| 4,330,144 | A | * | 5/1982 | Ridenour | F16L 13/166 285/382.5 |
| 4,390,303 | A | * | 6/1983 | Mallet | F16D 1/072 285/382.4 |
| 4,667,989 | A | * | 5/1987 | Daua Bona | F16L 23/0286 285/382.4 |
| 4,887,853 | A | * | 12/1989 | Flowers | F16L 19/02 285/382.4 |
| 5,478,122 | A | * | 12/1995 | Seabra | F16L 13/147 285/281 |
| 5,607,194 | A | * | 3/1997 | Ridenour | F16L 13/147 285/334.5 |
| 6,575,502 | B1 | * | 6/2003 | Ridenour | F16L 13/147 285/382.4 |
| 8,764,070 | B2 | * | 7/2014 | Park | F16L 23/0283 285/382.4 |
| 2001/0030422 | A1 | | 10/2001 | Kerr | |
| 2006/0236521 | A1 | * | 10/2006 | Ikawa | B21D 39/06 29/523 |
| 2012/0167655 | A1 | | 7/2012 | Arn | |
| 2013/0014744 | A1 | * | 1/2013 | Hensley | F24C 3/08 126/39 E |
| 2018/0135851 | A1 | * | 5/2018 | Biagioli | F24C 3/082 |

FOREIGN PATENT DOCUMENTS

| | | |
|---|---|---|
| GB | 2288996 A | 11/1995 |
| WO | 200944775 A1 | 4/2009 |
| WO | 2013160790 A1 | 10/2013 |

OTHER PUBLICATIONS

International Search Report issued in PCT/EP2015/059784 dated Aug. 6, 2015, 3 pages.
Examination report issued in counterpart Australian application No. 2015261174 dated Mar. 18, 2019, 3 pages.

* cited by examiner

GAS-SUPPLY CONNECTION ASSEMBLY, A METHOD OF CONNECTING A GAS SUPPLY LINE TO A GAS INLET PORT, AND A GAS COOKING APPLIANCE

TECHNICAL FIELD

The present invention is directed to a gas-supply connection assembly for gas tightly connecting a gas supply line to a gas inlet port of a gas consumer, and to a method of gas-tightly connecting a gas supply line to a gas inlet port of a gas consumer.

PRIOR ART

In particular in the field of gas cooking appliances, in particular domestic gas cooking appliances, it is required to gas-tightly connect the gas-supply line to a respective gas burner body. Currently this is obtained in most cases by a screwed connection in combination with washer plates for obtaining gas-tight connections. However, in particular such types of gas-tight connections are comparatively laborious to be established and require comparatively long assembly times.

Therefore it is an object of the invention to avoid the disadvantages of the known state of the art solutions for gas-tightly connecting a gas supply line to a gas inlet port of a gas consumer, in particular a gas burner body of a domestic gas cooking appliance.

In particular a gas-supply connection assembly and a method of gas-tightly connecting a gas supply line to a gas inlet port of a gas consumer shall be provided which require comparatively short assembly times and are easy to be set up, and yet may provide sufficiently gas tight connections.

BRIEF SUMMARY OF THE INVENTION

This object is solved by claim 1, 8 and claim 10. Embodiments of the invention in particular result from the dependent claims.

According to claim 1, a gas-supply connection assembly for gas-tightly connecting a gas supply line to a gas inlet port of a gas consumer is provided.

The gas consumer in particular may be a gas burner, of a gas cooking appliance, in particular a domestic gas cooking appliance, gas heater and/or gas stove or furnace. Further, the gas consumer may be a device, appliance or element to be connected to the gas supply line in a gas-tight manner so as to be able to supply gas, in particular fuel gas or heating gas, to the device, appliance or element.

In particular, the gas-supply connection assembly may relate to the connection of the gas supply line to a gas inlet port provided in a burner body or burner main body of the gas burner, and/or any other type of gas heating element.

With the proposed gas-supply connection assembly, the gas supply line is inserted into the gas inlet port or positioned within the gas inlet port. The gas inlet port may be a bore, sleeve or bushing, in particular an inner sleeve or bushing, wherein the inner diameter thereof matches the outer diameter of the gas supply line, such that the gas supply line can be inserted into the gas inlet port, in particular into the sleeve and/or bushing, of the gas inlet port. The mutual adaptation or customization of the inner and outer diameters in particular shall be such that the inlet port, sleeve and/or bushing and/or the gas supple line, in particular the inner and/or outer surfaces thereof, are not impaired or damaged on inserting, i.e. only by the action of inserting, the gas supply line into the supply port, sleeve and/or bushing.

The gas supply line may be connected in a gas-tight manner to the gas inlet port in that a bulge section, in particular radial protrusion, is effectuated or generated at an outer circumference of the supply line in the inserted condition or state by plastic deformation. This in particular shall mean that the bulge section and/or protrusion may be generated in the condition in which the gas supply line is inserted, in particular fully inserted, into the gas inlet port, sleeve and/or bushing, by plastic deformation of the gas supply line. The plastic deformation of the gas supply line occurring in the inserted state in particular is such that it gas-tightly engages in a form-fit locking manner into a given indentation provided in an inner wall, in particular an inner circumference or wall of the inlet port, sleeve and/or bushing. The inner wall and/or indentation may have a circular or elliptic shape.

The term "plastic deformation" in particular shall mean, that the deformation applied to the gas supply line, in particular in the section overlapping with the indentation, is non-reversible, i.e. "plastic".

Deformation of the supply line in particular may be obtained by cold forming of the material of at least a section of the supply line inserted into the inlet port. In particular by plastic deformation, such as cold forming or other techniques, the initially straight, non-deformed, supply line or straight wall of the supply line, in particular material of the supply line wall, may be urged into the indentation by the action of a an axial force and/or a combination of an axial and torsional force, such that in the end condition it may fill or fully fill the indentation and thus may generate a form-fit, gas-tight connection.

In order to obtain the gas-tight connection via plastic deformation of the gas supply line, the gas consumer, in more details the gas inlet port, such as for example belonging to a gas burner body of a fuel gas burner, may be placed in a jig and locked therein, e.g. in a horizontal position relative to the gas supply pipe in its mounted position.

The gas supply line may be gripped by a chuck or similar device, which may be connected to a machine, such as a robot for example.

The machine or robot, which may include the jig or vice for tightly fixing the inlet port, may insert the gas supply line into the inlet opening. In more detail, an open end of the gas supply line may be inserted, in particular pushed or pressed, into the inlet opening, sleeve and/or bushing, of for example the burner body. The gas supply line preferably is inserted into the inlet opening until it abuts an abutment shoulder provided in the inner wall of the inlet port, sleeve and/or bushing.

In abutment with the abutment shoulder or similar means for axially abutting the gas supply line, an axial force, in particular a predetermined axial force or a combination of an axial force and a torsional force, either of which may be of predetermined strength, may be applied, for example by the machine or robot. The axial force or axial and torsional forces may be applied in such a way to the gas supply line, that the gas supply line, i.e. the tubing or a respective section of the wall of the gas supply line, plastically deforms into the indentation and thus generates a mechanically tight and gas tight connection between the gas supply line and the inlet port, in particular indentation.

The material of the gas supply line may for example be aluminum, a synthetic material, such as plastic, or similar deformable materials suitable for plastically deforming in a radial direction upon application of an axial force or an axial and torsional force to a pipe, line or duct made from respective material.

Plastic deformation of sections of the gas supply line near or nearby the indentation may lead to the expansion of the gas supply line walls or wall sections into the relevant indentation provided for example in the inner wall of the gas inlet port, to obtain a gas tight occlusion of the same and adequate mechanical seal.

Here it shall be mentioned again, that it is possible to apply just an axial force to the gas supply line or to apply a combination of an axial force and torsional force to the gas supply line. Applying also a torsional force in addition to an axial force component may facilitate or improve plastic deformation of the gas supply line into the indentation.

The indentation may comprise at least one protuberance extending radially inwards from an inner surface of the indentation. Preferably, the protuberance may have an elliptic shape. In particular such protuberances may contribute to obtaining a gas tight and mechanically tight connection between the gas supply line and inlet port. In particular, respective protuberances may enhance a form-fit connection establishing between the gas supply line and inlet port upon plastic deformation of the gas supply line. With respective protuberances the overall contact surface between the outer surface of the supply line and the inner surface of the inlet opening may be enlarged and an improved gas sealing properties may be obtained.

A bulge like protrusion formed upon plastic deformation and extending into and filling the indentation may comprise, in the final shape, dents cooperating with, in particular surrounding or enclosing the protuberances. In particular by providing respective protuberances, an additional sealing effect may be obtained due to the penetration of the protuberances into the plastic deformation of the gas supply line.

Preferably, the inner cross section of the hollow gas supply line in the region of the deformation is the same or essentially the same than prior to the deformation process. The inner diameter after deformation at least shall be such that sufficient gas can be delivered to the gas consumer.

The bulge section in particular may be in the shape of a radial, in particular circumferential, protrusion projecting into a given or preset radial, in particular circumferential, groove provided in an inner wall of the bushing or bore of the gas inlet port.

By plastically deforming the gas supply line to fill or occupy a preset groove provided in an inner wall, in particular bushing, of the gas inlet port, a gas-tight, gas-leakage-free connection between the gas supply line and gas inlet port can be obtained, in particular in a comparatively time-saving and easy way.

The connection between the supply line and inlet port, in particular plastic deformation of the gas supply line, can for example be performed automatically by a machine or robot as described further above. This in particular may lower manufacturing cost, and improve quality and uniformity of the gas-tight connections.

For establishing the gas-supply connection assembly, it is possible to use straight gas supply lines, in particular gas supply lines having a straight cylindrical shape at least in the region where the connection with the gas inlet port is set up. The proposed connection can be set up without requiring preforming of the gas supply line prior to inserting the same into the bushing and plastic deformation.

The gas supply line may be made from aluminum, or a similar or other material having sufficient ductility such that a straight section of the supply line may be plastically deformed into the indentation, which may be a recess, groove or deepening.

Preferably, the bulge and indentation are formed in an inner axial section of the inlet opening. The indentation preferably is spaced from an outer edge of the inlet opening such that sufficient mechanical strength of a flange-like section between the indentation and outer edge remains.

In an exemplary embodiment of a gas burner assembly, where a gas inlet port of a gas burner is connected with a gas supply line in accordance with the technique as proposed herein, an inner diameter of the gas inlet port may be between 7.0 mm and 7.5 mm, and a reduction of the inner diameter at the abutment shoulder may be about 0.5 mm to 0.7 mm. A largest inner diameter of the indentation may be in the range between 10 mm and 10.5 mm. Regarding axial extensions of the gas inlet port, indentation and related elements, a flange between an outer end of the gas inlet port and the outer edge of the indentation may have an axial length between 4.0 mm and 5.0 mm. The abutment shoulder may be displaced inwardly from the outer edge of the inlet opening by about 15 mm. Regarding the axial extension of the indentation, may extend in axial direction of the inlet opening in total over 8.0 mm to 8.5 mm, wherein a cylindrical section thereof, preferably free of tapered walls, may extend in axial direction over 2 mm to 4 mm, and a section merging from the cylindrical section and comprising tapered walls may extend over an axial length of 1.5 mm to 2.0 mm.

Providing the indentation sufficiently distant from the outer end of the bushing may lead to advantageous mechanical strength and stability of the connection.

In embodiments, the bulge section may be implemented as a flange-type protrusion. This in particular shall mean that the bulge section, which is complementary to the indentation, may be shaped according to a flange, in particular a circumferential radial flange. A respective flange may have straight or inclined axial flange faces or mixtures thereof.

In embodiments, the indentation, which is complementary to the bulge section, may comprise at least one tapered section. This in particular shall comprise indentations having, at least in sections, gradually varying, in particular gradually decreasing, diameters. In particular, at least one wall section of the indentation may be inclined relative to the axial direction such that a tapering is obtained.

Tapered sections provided with the indentation may be advantageous for obtaining optimal filling of the indentation with the bulge section generated by or during plastic deformation of the supply line. This in turn is advantageous for the leakproofness of the connection. Moreover, tapered sections may be advantageous for obtaining high mechanical strength and durability of the gas-tight connection.

In embodiments, the indentation and complementary bulge may be formed such that they establish a barbed-hook shaped connection between the supply line and inlet port, e.g. bushing, in a direction of gas flow through the connection assembly. Such a barbed-hook shaped connection may ensure a tight axial seat and reliable axial form-fit, in particular relative to pulling forces, in particular pulling forces acting upon the supply line inserted into the bushing.

The barbed-hook shaped connection preferably is obtained in that the indentation comprises one straight axial wall essentially parallel to the radial direction and one opposing wall inclined relative to the radial direction.

Preferably, the barbed-hook shape is implemented such that the inclined wall is positioned downstream the straight wall, relative to direction of the gas flow through the gas supply line and bushing. In this variant, improved resistance against forces generated by gas pressure inside the supply line and gas consumer may be obtained.

In embodiments, the gas inlet port, in particular bushing, may comprise a cross sectional constriction, in particular a tapering, acting as an abutment shoulder where an axial end section of the supply line abuts in the inserted condition.

A respective abutment shoulder may restrict the length of the supply line within the bushing. Moreover, the cross sectional constriction or abutment shoulder may contribute or help to properly plastically deform the supply line to bulge into the indentation.

According to claim 8, a method of gas-tightly connecting a gas supply line to a gas inlet port of a gas consumer is provided. The method in particular is configured to obtain a gas-supply connection assembly according to any embodiment and variant as described above and further above as well as further below.

According to the proposed method, a connection section of the gas supply line is first inserted into a bushing of the gas inlet port, and is then plastically deformed such that a bulge section is formed within the bushing at an outer circumference of the supply line such that the bulge section engages a given counterpart indentation formed in an inner circumference of the bushing in a form-fit and gas tight manner.

In particular, by carrying out the method, the supply line, i.e. material of the wall of the supply line, is deformed into the indentation, whereby the bulge section is generated which connects the gas supply line and gas inlet port together in a mechanical fixed and gas-tight joint or interconnection.

In embodiments of the method, the bulge section may be formed or generated by pressing the gas supply line into the bushing; or in other words, a pressing force may be exerted to the gas supply line such that the gas supply line plastically deforms and bulges into the indentation. The pressing force may be exerted in parallel to the axial direction of the gas supply line and bushing.

Apart from applying axial forces, also torsional forces relative to the axial direction of the gas supply line may be applied for or during establishing the gas-tight connection.

Further details of establishing the gas-tight connection between the gas supply line and inlet opening, in particular the indentation, in particular result from the more detailed description above and further below. In particular, the gas supply line may be inserted into the gas inlet opening until an axial end of the gas supply line abuts an inner abutment flange of the gas inlet opening. This may be done by a machine, in particular robot. Having obtained the aforementioned condition, an axial force or a combined axial and torsional force may be applied to the gas supply line so as to plastically deform sections of the gas supply line into the indentation. After plastically deforming the gas supply line such that a bulge section generated by the action of the force or forces fills the indentation, a gas tight connection between the gas supply line and inlet opening is established. For advantages further reference is made to the description above and further below, which apply mutatis mutandis.

According to claim 10, a gas cooking appliance is provided which comprises a at least one gas burner and a gas-supply connection assembly as described herein in any embodiment and variant, wherein the gas-supply connection assembly is provided to connect a gas supply line of the gas burner to a gas input port of the gas burner

BRIEF DESCRIPTION OF THE FIGURES

Exemplary embodiments of the invention will now be described in connection with the annexed figures, in which.

DETAILED DESCRIPTION OF THE PREFERRED EMBODIMENTS

Figure 1:
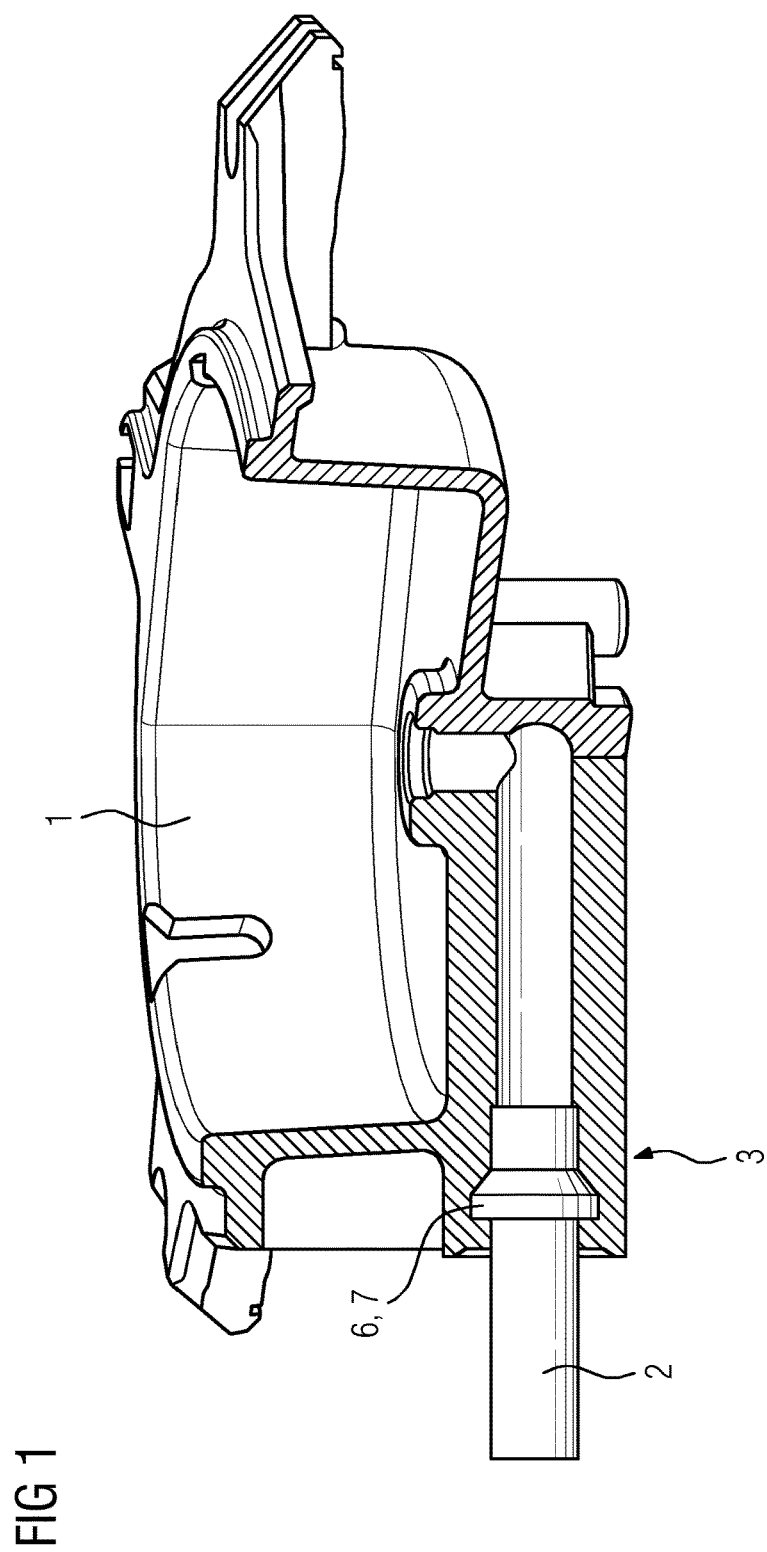
FIG. 1 shows a partial sectional view of a gas-supply connection assembly.

FIG. 1 shows a partial sectional view of a gas-supply connection assembly. The connection assembly in the present case is related to a gas burner of a domestic gas stove or gas cooking appliance, and comprises in the present embodiment a gas-burner body 1 of a gas burner of the gas stove and a gas supply line 2 or gas supply pipe.

The gas supply line 2 is intended for supplying gas to the gas burner for operating the same. Therefore, a gas-tight connection or interconnection between the gas supply line 2 and a gas inlet port 3 of the gas-burner body 1 is required.

Figure 2:
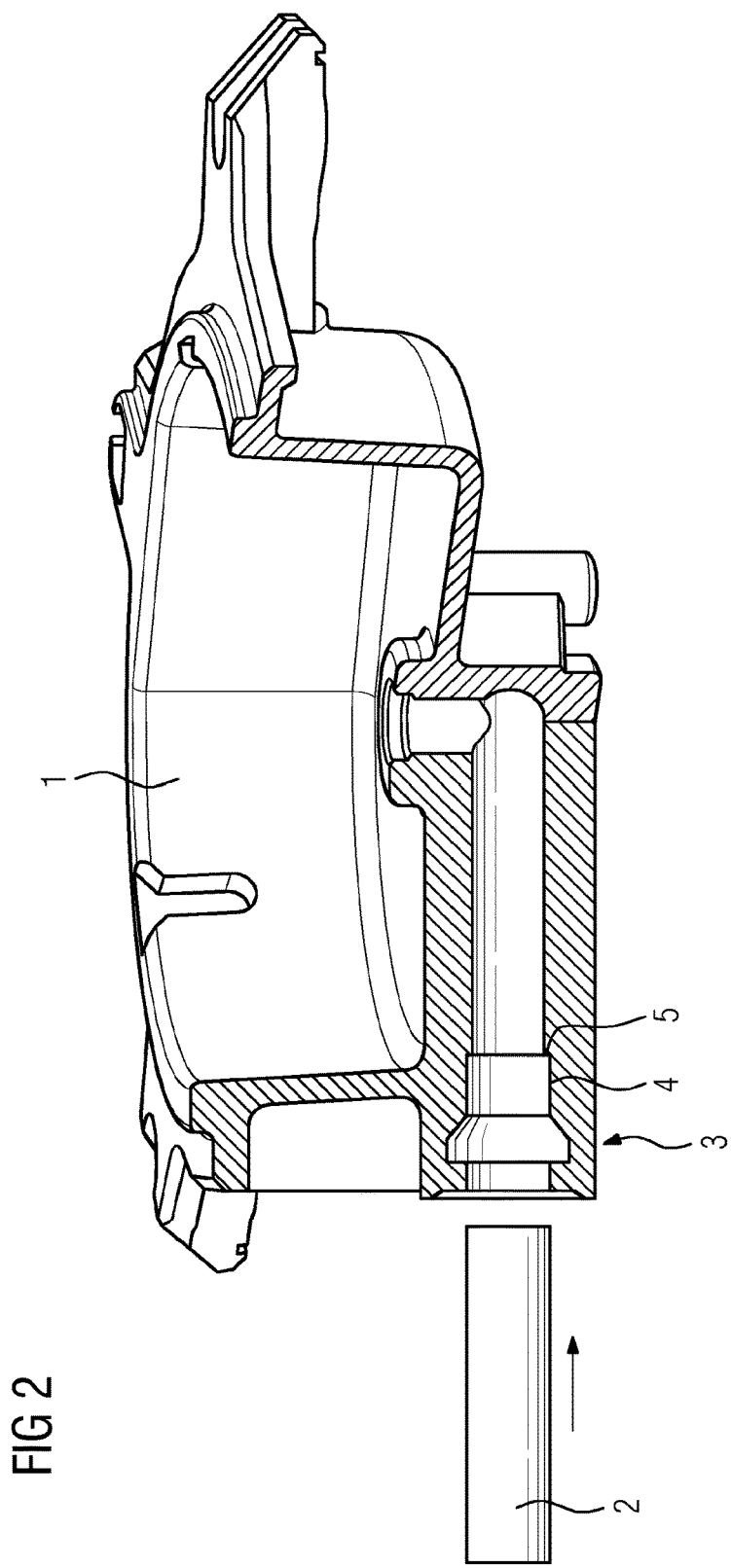
FIG. 2 shows the gas-supply connection assembly in a pre-assembled state.
Figure 3:
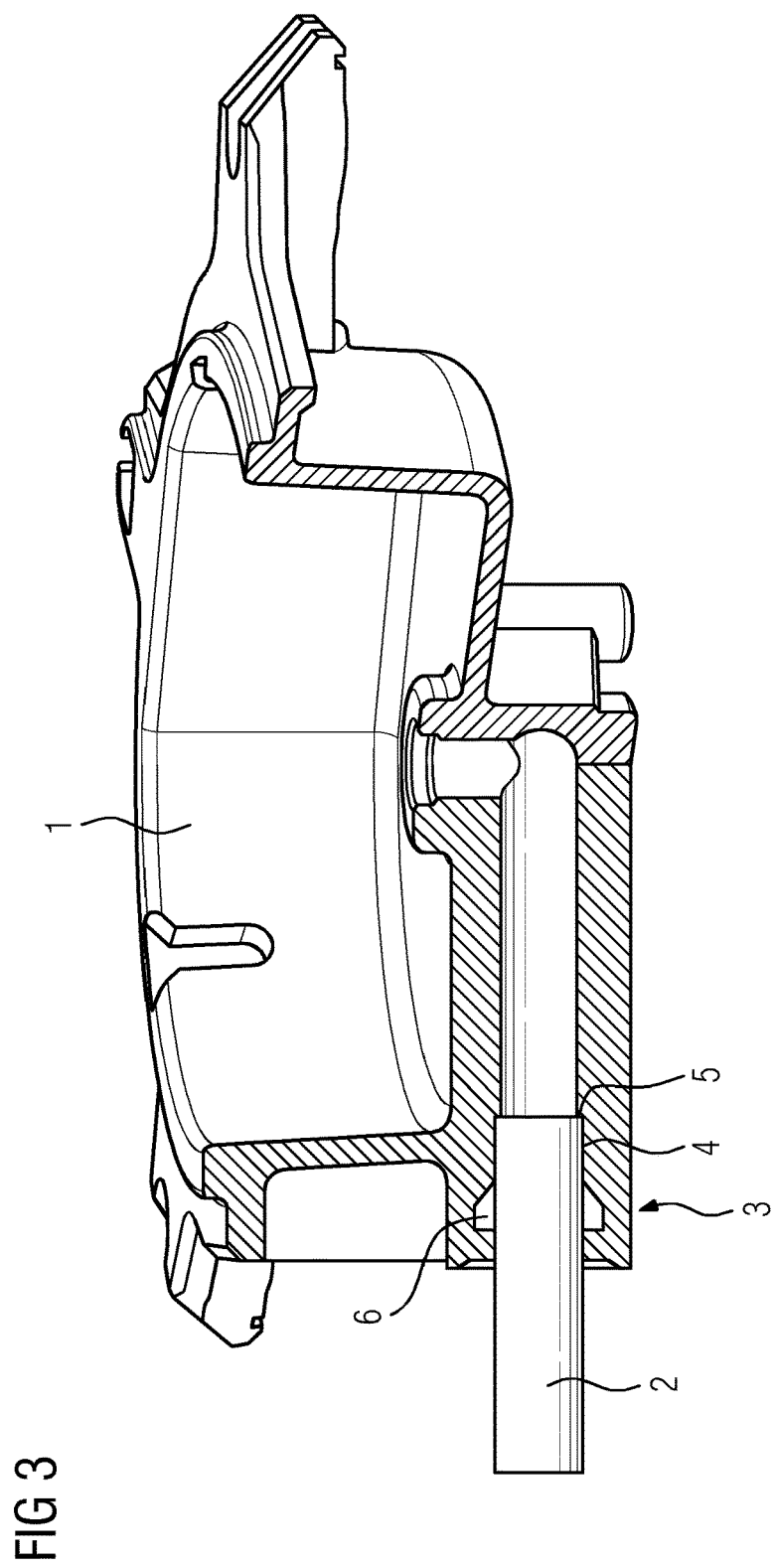
FIG. 3 shows the gas-supply connection assembly in a partly assembled state.

For explaining how the gas-tight connection between the gas-supply line 2 and gas inlet port 3 is obtained in accordance with the present invention, additional reference is now made to FIG. 2 and FIG. 3 respectively showing the gas-supply assembly in the pre-assembled state, prior to assembly, and in a partly assembled state.

As can be seen from FIG. 2, a straight end section of the gas supply line 2, i.e. a straight end section of the gas supply line 2 that is preferably free from bulges, bumps and/or recesses, is provided and, in accordance with the direction as indicated by the arrow given in FIG. 2, is inserted into a bushing 4 of the gas inlet port 3.

The bushing 4 may be implemented as a cylindrical bore or hole, wherein the inner diameter of the bushing 4 is matched with the outer diameter of the gas supply line 2 such that the gas supply line 2 fits and can be inserted into the bushing 4.

In the gas inlet port 3, in particular at the inner end of the bushing 4, there may be provided a cross sectional constriction acting as an abutment shoulder 5 for abutment of the gas supply line 2, in particular to define and/or restrict the length of the gas supply line 2 to be inserted into the bushing.

The configuration in which the gas supply line 2 is properly inserted into the bushing 4 and at its axial end section abuts against the abutment shoulder 5 can be seen in FIG. 3.

As soon as the gas supply line 2 is inserted into the bushing 4 in accordance with the situation shown in FIG. 3, a pressing force acting in axial direction or a combination of a pressing force acting in axial direction and torsional force is exerted on the gas supply line 2 such that in particular a section of the gas supply line 2 inserted into the bushing 4 plastically deforms.

The bushing 4 at a certain distance from its outer and inner ends comprises an indentation 6, and plastic deformation of the gas supply line 2 is conducted in such a way and/or applying the force/s to the gas supply line 2 automatically causes that the gas supply line 2 in particular in the region of the indentation 6 plastically deforms into and fills the indentation 6 with a corresponding bulge section 7. This corresponds to the situation as shown in FIG. 1.

In particular by plastically deforming the straight supply line 2 into the indentation 6, a form-fit connection between the gas-supply line 2 and the gas-burner body 1 can be obtained. Such form-fit connections have been found out to be sufficiently gas-tight to be successfully used at least with gas supply lines and gas burners of domestic gas cooking appliances.

Establishing the form-fit and gas-tight connection between the gas supply line 2 and gas-burner body 1 can be conducted in an automated way which may in particular result in cost advantages. Beyond that, a respective connection can be set up in a comparatively easy way.

As can be seen from FIG. 1 to FIG. 3, the bulge section 7 is shaped as a circumferential flange, with two opposing axial faces. One of the axial faces is parallel to the radial direction and the other one located further inwards is inclined relative to the radial direction.

The indentation 6 is shaped accordingly, e.g. as a circumferential groove, with two opposing axial faces, where one is parallel to the radial direction and the other one is inclined relative to the radial direction.

The indentation 6 and bulge section 7 in the present example are shaped such that the interconnection between the bulge section 7 and indentation 6 is a type of barbed-hook shaped connection.

Figure 4:
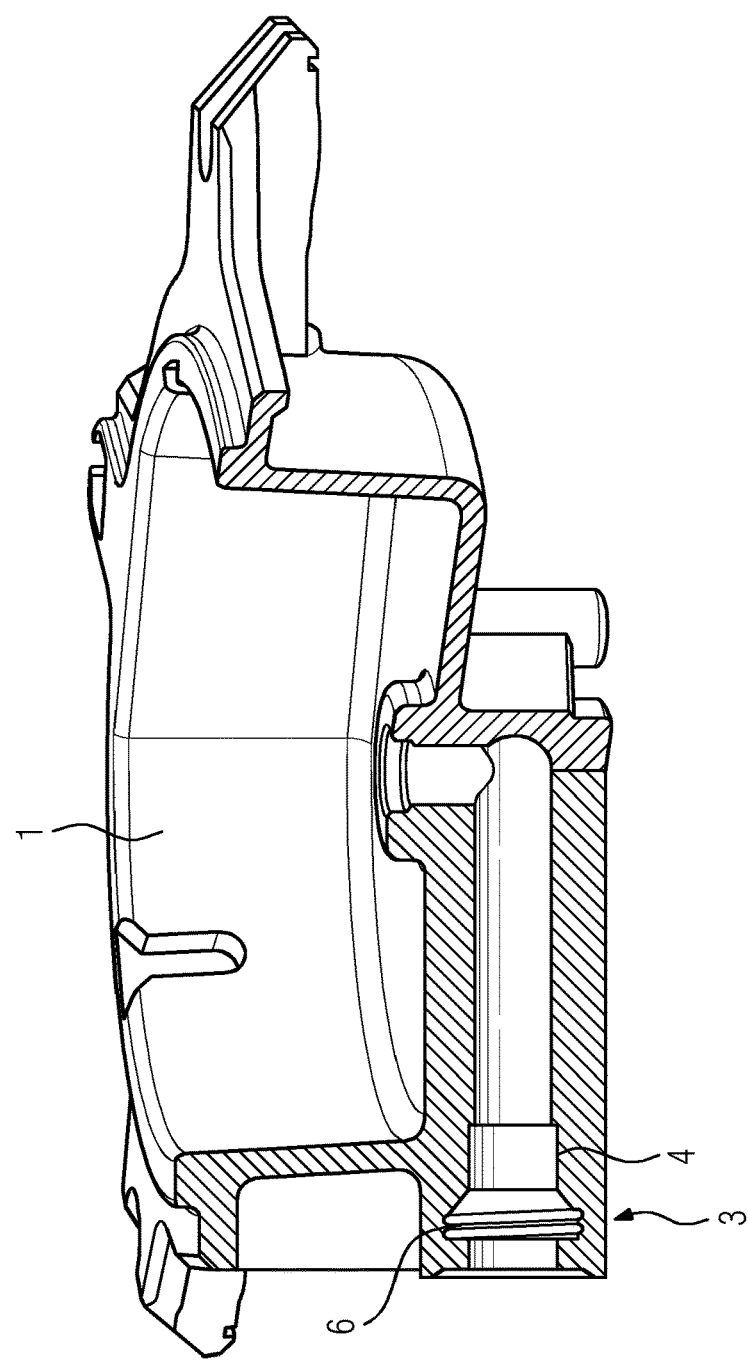
FIG. 4 shows a gas burner body related to a further embodiment of the gas-supply connection assembly.

The barbed-hook effect in particular is established to work against forces acting on the gas supply line 2 in a direction out of the bushing 4. Hence a comparatively tight connection both relative to mechanical strength and leakproofness can be obtained FIG. 4 is related to a gas burner body of a further embodiment of the gas-supply connection assembly. The difference to the embodiment shown in FIG. 1 to FIG. 3 essentially lies in the shape of the indentation 6, which in the embodiment of FIG. 4 may have a more elliptical cross section.

Further, in variants, the indentation may comprise at inner walls thereof one or more protuberances extending radially inwardly. The protuberances may have an elliptical shape. Upon plastic deformation, the material of the gas supply line undergoing plastic deformation may flow around the protuberances and enclosed tightly enclose them, which may lead to improved leakproofness.

In all, it becomes clear, that the proposed technique for connecting a gas supply line to a consumer inlet port is efficient in obtaining adequate leakproof connections in a comparatively easy and/or cost-efficient way.

LIST OF REFERENCE NUMERALS 1 gas-burner body
2 gas supply line
3 gas inlet port
4 bushing
5 abutment shoulder
6 indentation
7 bulge section

The invention claimed is:

1. A gas-supply connection assembly for gas-tightly connecting a gas supply line to a gas inlet port of a gas consumer appliance, in which the gas supply line is inserted into the gas inlet port and connected thereto in that a bulge section effectuated at an outer circumference of the gas supply line in an inserted condition by plastic deformation thereof gas-tightly engages in a form-fit locking manner into a given indentation in an inner bushing of the gas inlet port, the indentation having a convergent inner-circumferential face that faces radially inward and gradually converges radially inward in an insertion direction of the gas supply line.

2. The gas-supply connection assembly according to claim 1, wherein the bulge section and indentation are formed in an inner axial section of the bushing.

3. The gas-supply connection assembly according to claim 1, wherein the indentation comprises at least one protuberance extending radially inwards from an inner surface of the indentation.

4. The gas-supply connection assembly according to claim 3, said at least one protuberance having an elliptic shape.

5. The gas-supply connection assembly according to claim 1, wherein the bulge section is implemented as a flange-type protrusion.

6. The gas-supply connection assembly according to claim 1, wherein the bulge section and indentation are formed to establish a barbed-hook shaped connection between the supply line and gas inlet port.

7. The gas-supply connection assembly according to claim 1, wherein the convergent inner-circumferential face acts as an abutment shoulder where an axial end section of the supply line in the inserted condition abuts.

8. A gas cooking appliance comprising at least one gas burner and the gas-supply connection assembly according to claim 1 connecting a gas supply line to a gas input port of the gas burner.

9. The gas-supply connection assembly according to claim 1, said indentation having a second inner-circumferential face oriented parallel to said insertion direction, said convergent inner-circumferential face depending from a downstream end of the second inner-circumferential face.

10. The gas-supply connection assembly according to claim 9, said indentation further having a third inner-circumferential face that extends radially inward and is oriented perpendicular to said insertion direction, the third inner-circumferential face depending from an upstream end of the second inner-circumferential face.

11. A method of gas-tightly connecting a gas supply line to a gas inlet port of a gas consumer appliance, wherein a connection section of the gas supply line is first inserted into a bushing of the gas inlet port, and is then plastically deformed such that a bulge section is formed within the bushing at an outer circumference of the supply line such that the bulge section engages a given counterpart indentation formed in an inner circumference of the bushing in a form-fit and gas tight manner, the indentation having a convergent inner-circumferential face that faces radially inward and gradually converges radially inward in an insertion direction of the gas supply line.

12. The method according to claim 11, wherein the bulge section is formed in that the gas supply line is pressed into the bushing by applying an axial force or by applying a combination of an axial and torsional force to the gas supply line.

13. The method according to claim 11, said indentation having a second inner-circumferential face oriented parallel to said insertion direction, said convergent inner-circumferential face depending from a downstream end of the second inner-circumferential face.

14. The method according to claim 13, said indentation further having a third inner-circumferential face that extends radially inward and is oriented perpendicular to said insertion direction, the third inner-circumferential face depending from an upstream end of the second inner-circumferential face.

* * * * *